(12) United States Patent
Coerman et al.

(10) Patent No.: US 11,738,618 B2
(45) Date of Patent: Aug. 29, 2023

(54) SYSTEM AND METHOD FOR DYNAMIC MONITORING OF VIBRATION DAMPERS

(71) Applicant: Ford Global Technologies, LLC, Dearborn, MI (US)

(72) Inventors: Cyril Coerman, Leverkusen (DE); Georg Maurer, Cologne (DE); Shi Yan, Aachen (DE)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 319 days.

(21) Appl. No.: 17/036,707

(22) Filed: Sep. 29, 2020

(65) Prior Publication Data
US 2021/0094377 A1 Apr. 1, 2021

(30) Foreign Application Priority Data

Oct. 1, 2019 (DE) .......................... 102019126453.7

(51) Int. Cl.
*B60G 17/019* (2006.01)
*B60G 15/06* (2006.01)

(52) U.S. Cl.
CPC ....... *B60G 17/01933* (2013.01); *B60G 15/06* (2013.01); *B60G 2204/62* (2013.01); *B60G 2400/204* (2013.01); *B60G 2400/252* (2013.01); *B60G 2400/60* (2013.01); *B60G 2600/044* (2013.01); *B60G 2600/0422* (2013.01)

(58) Field of Classification Search
None
See application file for complete search history.

(56) References Cited

U.S. PATENT DOCUMENTS

| 8,452,552 | B2 * | 5/2013 | Nobis | G01M 17/04 |
| | | | | 702/56 |
| 9,109,913 | B2 * | 8/2015 | Lu | G08G 1/0112 |
| 9,448,139 | B2 * | 9/2016 | Kraus | G01M 17/04 |
| 2003/0230443 | A1 * | 12/2003 | Cramer | B62D 21/152 |
| | | | | 180/65.51 |

(Continued)

FOREIGN PATENT DOCUMENTS

| CN | 102752360 A | 10/2012 |
| WO | 2017142536 | 8/2017 |
| WO | 2018119423 | 6/2018 |

*Primary Examiner* — Daniel L Greene
(74) *Attorney, Agent, or Firm* — BURR & FORMAN LLP; Lorne Forsythe

(57) ABSTRACT

A method for checking status of a vibration damper of a motor vehicle includes selecting a suitable section of a roadway, via processing circuitry at a server, based on section selection criteria comprising a number of passing vehicles, a data input sufficient for correlation analyses of the vibration damper, and homogeneity of the roadway. The method further includes acquiring data from a plurality of other vehicles while the other vehicles are driving through the section, grouping data items from the acquired data that are specifically associated with vibration damper status, classifying the status of the vibration damper based on the data items, and informing the driver about the status of the vibration damper. The data on the number of the other vehicles may include data indicative of other vehicle vibration dampers in new condition defining reference values for a degree of wear of the vibration damper.

19 Claims, 3 Drawing Sheets

(56) References Cited

U.S. PATENT DOCUMENTS

| | | | | |
|---|---|---|---|---|
| 2005/0241366 A1* | 11/2005 | Sonnenburg | .......... | G01M 17/04 73/11.04 |
| 2008/0039994 A1* | 2/2008 | Mannerfelt | .......... | G01M 17/04 701/33.9 |
| 2009/0099719 A1* | 4/2009 | Namuduri | .......... | G01M 17/04 701/29.4 |
| 2010/0324781 A1* | 12/2010 | Gagliano | .......... | B60G 17/018 701/39 |
| 2011/0153158 A1* | 6/2011 | Acocella | .......... | B62K 25/04 701/37 |
| 2013/0060423 A1* | 3/2013 | Jolly | .......... | B60W 50/14 701/38 |
| 2015/0239391 A1* | 8/2015 | Foltin | .......... | B60Q 1/115 701/49 |
| 2016/0325595 A1* | 11/2016 | Wagner | .......... | B60G 17/0165 |
| 2017/0032592 A1* | 2/2017 | Lu | .......... | G07C 5/0808 |
| 2017/0113508 A1* | 4/2017 | Unger | .......... | G06V 20/56 |
| 2017/0274855 A1* | 9/2017 | Laskey | .......... | G07C 5/0808 |
| 2019/0102959 A1* | 4/2019 | Saylor | .......... | G07C 5/006 |
| 2021/0086576 A1* | 3/2021 | Du | .......... | B60G 17/015 |
| 2021/0291611 A1* | 9/2021 | Bruno | .......... | B60G 17/0165 |

* cited by examiner

SYSTEM AND METHOD FOR DYNAMIC MONITORING OF VIBRATION DAMPERS

CROSS-REFERENCE TO RELATED APPLICATIONS

This application claims priority to German Application No. 102019126453.7, filed on Oct. 1, 2019, the contents of which are incorporated herein by reference in their entirety.

TECHNICAL FIELD

Example embodiments generally relate to vibration dampers for vehicles and, more particularly, relate to a method and system for monitoring the function of vibration dampers in a vehicle.

BACKGROUND

When unevenness is encountered on a roadway being traveled over, vibrations of the wheels are generated, which cause the contact force of the corresponding vehicle with respect to the roadway to vary. As a result, the changing contact force can impact vehicle control. In order to cause the vibrations to decay as quickly as possible, vibration dampers are provided in the wheel suspension system of the vehicle.

Vibration dampers (e.g., shock absorbers) that are used in this context are subject to wear, as a result of which their damping effect gradually decreases. As the shock absorbers wear, undesired reverberations could occur when instances of unevenness are traversed. Drifting of the vehicle may occur when bends are traveled through while vibrating steering during braking. Uneven abrasion of tires and increased tire wear may also result. However, wear is not easy to detect. As a result, suddenly occurring failure of a vibration damper cannot be foreseen. Thus, some level of vehicle wear monitoring operations may be conducted during which the function of components may be monitored with different sensors whose data is transmitted to processing circuitry in the cloud. See, for example, WO2017/142536 A1, WO2018/119423 A1, and CN 102752360 A) for discussions regarding the general concept of monitoring wear of components in a vehicle. However, none of these monitoring operations relate to vibration dampers.

BRIEF SUMMARY OF SOME EXAMPLES

Some example embodiments may provide a method for checking status of a vibration damper of a motor vehicle. The method may include selecting a suitable section of a roadway, via processing circuitry at a server, based on section selection criteria comprising a number of passing vehicles, a data input sufficient for correlation analyses of the vibration damper, and homogeneity of the roadway. The method further includes acquiring data from a plurality of other vehicles while the other vehicles are driving through the section, grouping data items from the acquired data that are specifically associated with vibration damper status, classifying the status of the vibration damper based on the data items, and informing the driver about the status of the vibration damper. The data on the number of the other vehicles may include data indicative of other vehicle vibration dampers in new condition defining reference values for a degree of wear of the vibration damper.

In accordance with an example embodiment, a vehicle suspension system for a motor vehicle having at least two wheels is provided. Each of the at least two wheels may include an instance of a vibration damper in a respective corner area of the vehicle. The system may include a control device comprising processing circuitry, a connecting device configured to enable wireless communication between the vehicle and the internet, and a man-machine interface for providing information to a driver of the vehicle. At least one vibration damper in a front part of the vehicle may have a first height sensor, and at least one vibration damper in a rear part of the vehicle may have a second height sensor.

BRIEF DESCRIPTION OF THE SEVERAL VIEWS OF THE DRAWING(S)

Having thus described the invention in general terms, reference will now be made to the accompanying drawings, which are not necessarily drawn to scale, and wherein:

DETAILED DESCRIPTION

Figure 1:
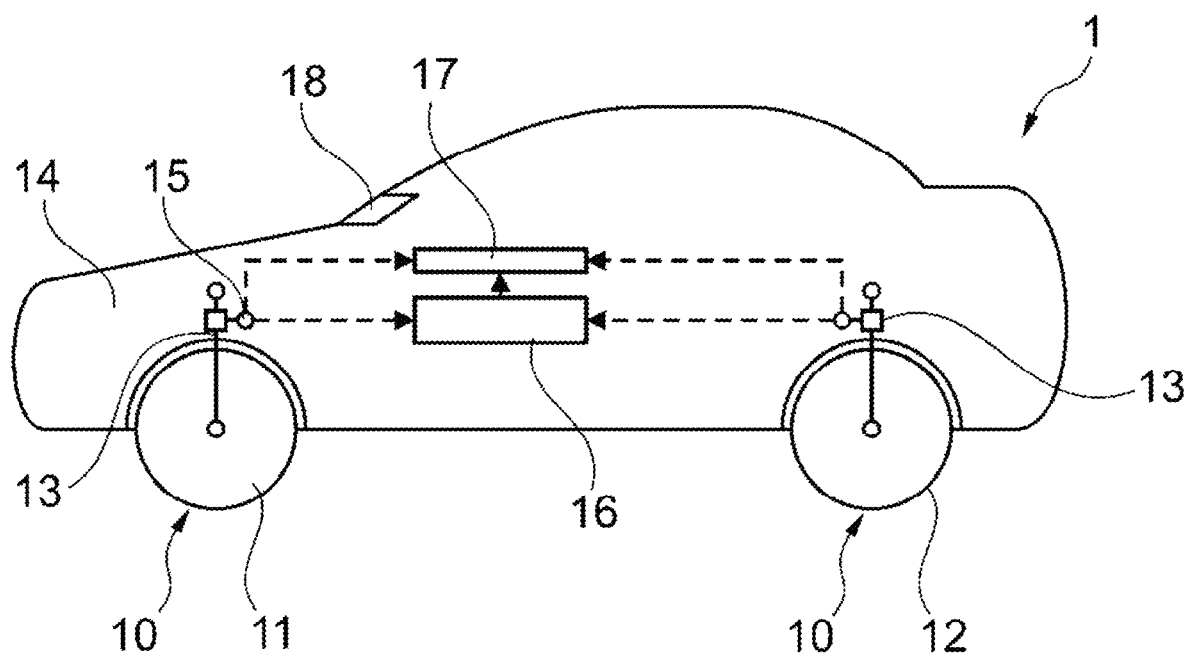
FIG. 1 illustrates a schematic representation of components of a vehicle in which a method or system for vibration damper monitoring may be accomplished in accordance with an example embodiment.

Some example embodiments now will be described more fully hereinafter with reference to the accompanying drawings, in which some, but not all example embodiments are shown. Indeed, the examples described and pictured herein should not be construed as being limiting as to the scope, applicability or configuration of the present disclosure. Rather, these example embodiments are provided so that this disclosure will satisfy applicable legal requirements. Like reference numerals refer to like elements throughout. Furthermore, as used herein, the term "or" is to be interpreted as a logical operator that results in true whenever one or more of its operands are true. As used herein, operable coupling should be understood to relate to direct or indirect connection that, in either case, enables functional interconnection of components that are operably coupled to each other. It should be noted that the features and measures presented individually in the following description can be combined in any technically feasible manner, giving rise to further embodiments of the invention. The description additionally characterizes and specifies aspects of some example embodiments, particularly in conjunction with the figures.

Some example embodiments described herein may provide a method for checking the status of at least one vibration damper of a motor vehicle in a context in which data of the vehicle are recorded in a section of a roadway and the current status of the vibration damper is assessed on the basis of the data. The data may be transmitted to a server or other remotely located processing circuitry and compared with data on the server that is associated with other vehicles operating in the same section of the roadway. Some operations associated with performance of the method may include:

selecting a suitable section of a roadway (e.g., via the processing circuitry) on the basis of criteria that include the number of passing vehicles so that a data input sufficient for correlation analyses of the vibration damper and homogeneity of the roadway is achieved;

acquiring data on a number of vehicles driving through the section of the roadway, while the driving through occurs;

grouping data items reported by the vehicles, and which are specifically associated with the vibration dampers thereof, according to the running time of the vibration damper;

classifying the status of the vibration damper based on the data, wherein the data from vehicles with vibration dampers in new condition are used as reference values for non-worn vibration dampers; and informing the driver of a specific one of the vehicles about the status of one or more of the vibration dampers in his/her specific one of the vehicles.

The method may enable the driver or the users of the vehicle to obtain precise current information about the current status of the vibration dampers of the vehicle. This makes it possible to counteract negative effects of worn vibration dampers early. All the vibration dampers of a corresponding vehicle may ideally be monitored with the method.

Furthermore, predictive planning of the replacement of vibration dampers can be carried out with respect to available time and financial means. In this context, example embodiments may target execution of the method with respect to a large number of vehicles which drive through the section of roadway. The vehicles may be checked and the corresponding data may be collected at a central point (e.g., a server). Each of the vehicles may be designed, configured or otherwise capable of transmitting date to the central point or server. Thus, for example, each of the vehicles may have a connecting device which connects to the Internet. The number of vehicles may be desirable to be as high as possible, since a larger number of checked vehicles may provide a more reliable extrapolation of the data. For example, a section of roadway may be selected where the number of vehicles passing (and capable of communicating with the server) in a given time period is more than 100 vehicles, or perhaps even more than 1000 vehicles.

In an example embodiment, selection of the section of the roadway in which the data of the vehicle(s) is recorded may be dynamically accomplished by the server. In this context, for example, the server may be configured to determine, on the basis of constantly received vehicle data, which sections of the roadway are appropriate for evaluation of shock absorber-related data. In this context, allowance may be made for the fact that roadway conditions change continuously, e.g., as a result of structural measures (e.g., application of asphalt) and as a result of erosion. An untreated section of a roadway, which may be deemed appropriate for the method over one period of time, may no longer be used at a later time if the roadway is provided with a smooth asphalt surface. In this regard, the smooth asphalt surface may render the section devoid of useful data for the period of time over which the surface remains smooth. At an even later time, the same section could, however, be used again if the asphalt surface has changed as a result of bumps and depressions, thereby making the section again suitable for use in connection with example embodiments.

In various example embodiments, the vehicle may be a motor vehicle. The roadway may, for example, be an asphalted or concrete road. The homogeneity of a roadway section may be determined based on a strong correlation between the cleaned or normalized data relating to the spring travel distance within the vibration dampers of a large number of vehicles.

Data that is studied in connection with operation of example embodiments may include any or all of:

average speed of deflection and total amount of deflection of the damper,
average vehicle speed,
weight of the vehicle,
weight of the vehicle acting on the vibration damper,
service life of the vibration damper, and
presence of a continuous controlled damping (CCD) mode.

In an example embodiment, the speed of deflection relates to the averaged speed with which the vibration damper respectively experiences spring compression and rebound. The total amount of spring deflection is the total amount of travel which the spring damper executes during spring compression and rebound. The corresponding data can be acquired by means of suitable sensors in the region of the vibration damper, which sensors may be designed to determine movements of the respective vehicle corner with sufficient accuracy, and may, for example, include acceleration sensors or optical distance sensors.

In an example embodiment, the type of the vibration damper can also be included in the calculations in order to compare the wear with identical types of dampers. In other words, data may be stored in a segregated fashion according to damper type, so that comparisons made for a given vehicle damper are limited to those of the same type. However, in some cases, when a specific amount of wear, which correlates with effects on the driving properties of a vehicle, is exceeded, the type of vibration damper may not be decisive, since the effects of some amounts of wear may relate equally to all vibration dampers.

In an example embodiment, the average speed may be measured, for example, by means of the tachometer of the vehicle and is averaged by the control device, or else by means of wheel speed encoders or by means of Global Positioning System (GPS). The weight of the vehicle can be determined approximately on the basis of manufacturer details plus the weight of vehicle occupants, the cargo and the fuel. To be more precise, the weight of the vehicle can be determined by means of a combination of the average spring travel of the damper with the quotient of the calculated torque or brake torque by means of the dynamic wheel radius by means of the longitudinal acceleration. The longitudinal acceleration may, in this context, be corrected for vehicle movements and the gradient of the road. In the case of values which differ greatly from the average speed values and weight values, the data of the respective vehicles may not be taken into account in the evaluation of the status. Moreover, in some cases, weight (e.g., Corner Weight) which acts on the vibration damper may be calculated as a function of the weight of the vehicle and the distribution of the weight.

In an example embodiment, the service life of the vibration damper may be calculated according to the time since installation (or time in use) and the distance (e.g., in miles or kilometers) traveled since the installation of the vibration damper. In this context, in vehicles in which the vibration damper has not ever been changed, the service lives of the vehicles and vibration dampers correlate to one another. Information about a change of vibration dampers may be stored in a vehicle device, noted by the installing mechanics and/or stored in the cloud. In cases in which completely worn vibration dampers are replaced by ones in a new condition, this replacement event can be derived from the data.

In one embodiment, the knowledge of whether the vehicle has or is in a CCD mode may be useful, because effects owing to the action of active or semi active vibration dampers can be taken into account during the evaluation of the status of the vibration dampers.

In an example embodiment, the method may involve the classification of the status of the vibration damper, which may be accomplished on the basis of a performance index (IP) which may be determined with average values of the speed of deflection and the entire spring travel of the damper. The performance index may be determined with the formula listed below as equation (1).

$$IP = \left(c_a * \frac{\Sigma |V_D|}{N} + c_b * s_{Ftotal}\right) * c_v * c_l \quad (1)$$

In this context, $v_D$ is the current speed of deflection, N is the number of measurements, $s_{Ftotal}$ is the entire spring travel carried out, $c_v$ is a corrector factor for influencing the speed of the vehicle, and $c_l$ is a correction factor for influencing the weight of the vehicle and $c_a$ and $c_b$ are correction factors for influencing the speed of deflection and the spring travel of the damper.

In an example embodiment, the status of the vibration damper may be assessed by means of (or based on) the relationship of the performance index to defined threshold values. In this regard, for example, a plurality of threshold values may be assessed which each indicate a change of status of the vibration damper. In this context, the next wear status may be achieved whenever a threshold value is undershot. For example, a vibration damper can have a low level of wear, a high level of wear or an imminent loss of function as well as being defective.

Therefore, in one example embodiment, the driver may be informed about the current status of the vibration damper. This informing may be accomplished by means of a man-machine interface such as, for example, a display in the region of the dashboard. An alerting signal may be issued if the status of the vibration damper has reached a critical value which indicates wear or non-functioning of the vibration damper. The alerting signal can be issued via the man-machine interface in a written form on the display, e.g., in the form of a color scale, as a symbol, alerting light, alerting tone or differently or as a combination of the specified signal forms.

In some cases, a motor vehicle having at last two wheels and in each case at least one vibration damper assigned to the corresponding wheel suspension, in a corner area of the vehicle may employ example embodiments. In such cases, the vehicle may include a control device, a device for connecting to the Internet and a man-machine interface for informing the driver of the vehicle as to the status of the vibration damper(s). At least one vibration damper in the front part of the vehicle may include a sensor, and at least one vibration damper in the rear part of the vehicle also include a sensor for sensing the speed of deflection and the spring travel of the vibration damper.

According to another aspect of some example embodiments, each vibration damper may include a sensor for sensing the speed of deflection and the spring travel. As a result, each vibration damper can be monitored separately. Alternatively, the front part of the vehicle may have a height sensor, and the rear part of the vehicle has a height sensor, in the region of a corresponding vibration damper. In this case, the corresponding vibration dampers are characterized as worn on both sides of the vehicle when corresponding threshold values of the performance index are achieved.

FIG. 1 illustrates a vehicle 1 according to an example embodiment. The vehicle 1 of this example is a limousine with four wheels 10, wherein a front wheel 11 and a rear wheel 12 are respectively shown in the illustrated side view. The following statements apply equally to the wheels which are not shown. A vibration damper 13 may be respectively arranged in the region of the suspension of the wheels 11, 12. The vibration damper 13 may be configured to provide damping of the transmission of vibrations from the wheel 10 to the bodywork 14 of the vehicle 1.

The vibration dampers 13 may each have a height sensor 15 associated therewith. The height sensors 15 may be connected to a control device 16. The vehicle 1 may also include a connecting device 17 (or transmitter device) for connecting the vehicle to the Internet. Data which is specifically recorded by the height sensor 15 (e.g., based on the spring deflection and speed of deflection) are transmitted to the control device 16, and from there or directly from the height sensor 15 to a server 20 (see FIG. 2) via the connecting device 17, which may be capable of wireless transmission of communication signals. General data regarding the vehicle (e.g., type of the shock absorber, average vehicle speed, weight of the vehicle, weight acting in the region of the shock absorber, service life of the shock absorber, presence of a CCD mode) may be transmitted from the control device 16 to the server 20 via the connecting device 17. The server 20 may also include a connecting device 21 for connecting the server to the Internet (e.g., wirelessly or via a wired connection). The data may be collected at the server 20 and analyzed by comparison with data from other vehicles.

In some cases, the vehicle 1 may include a man-machine interface 18 for informing the driver of the vehicle 1 about the status of the shock absorbers. The man-machine interface 18 may, for example, be embodied as a display. The vehicle 1 may have further devices for informing the driver of various situations or information, e.g., for providing visual information by means of light-emitting diodes in the region of the dashboard, and/or acoustic devices.

Figure 2:
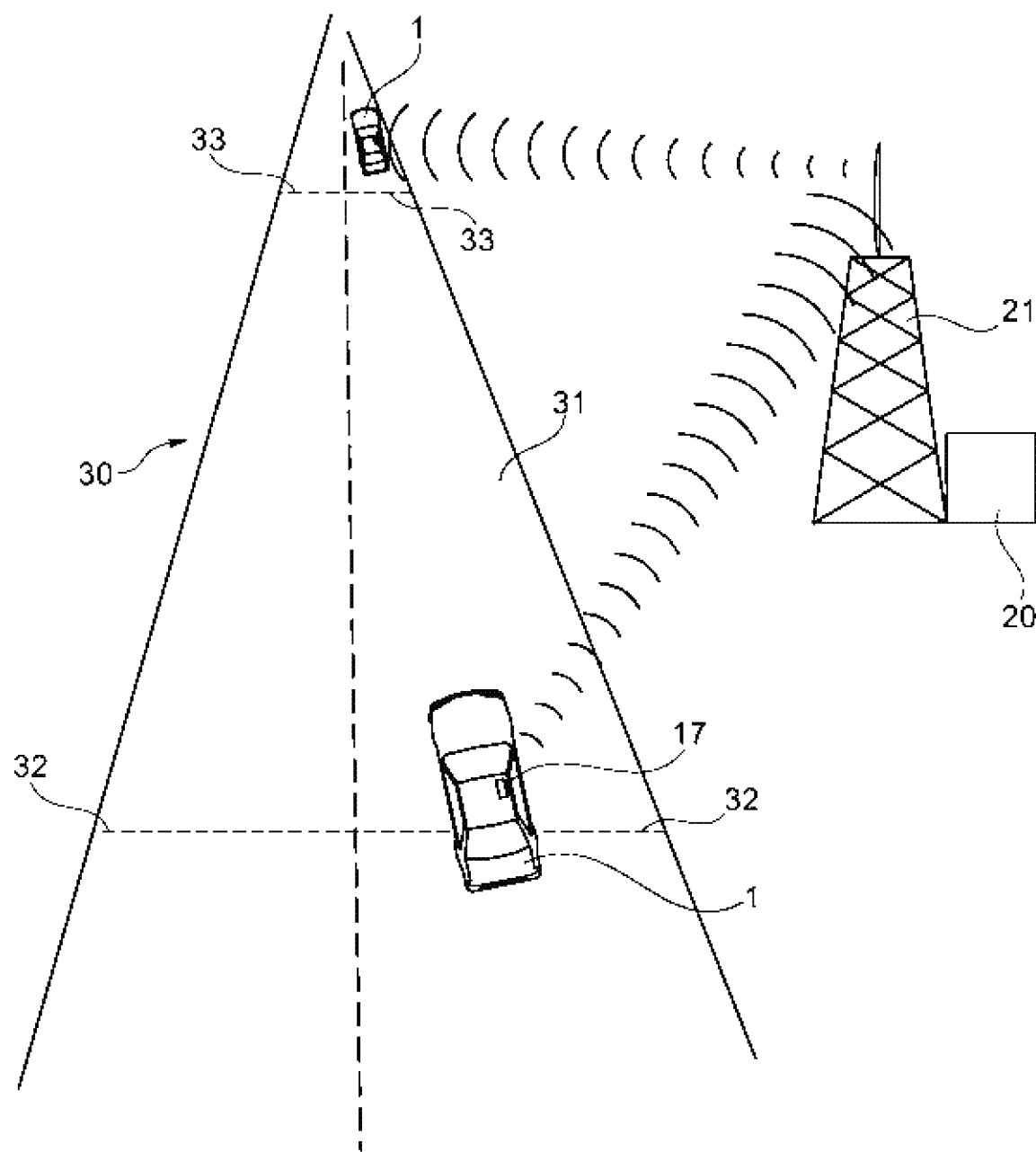
FIG. 2 illustrates a schematic representation of a monitoring scenario for the vibration dampers of a vehicle in accordance with an example embodiment.

FIG. 2 shows a situation in which data from the vehicle 1 and from the vibration dampers 13 is acquired specifically (see above) and transmitted to the server 20. The vehicle 1 drives through a section 31 on a roadway 30. Wireless Internet is available in the region of the roadway section 31. Alternatively, data can also be recorded and transmitted to the server 20 at a later point in time if there is temporarily no wireless Internet available. The recording of the data starts at the starting point 32 of the section 31 and ends at its end point 33. In this context, values of the speed of deflection and of the spring deflection of the vibration dampers 13 are recorded over the profile of the section 31, and are communicated to the server 20 (in real time or at some later time). The recorded data is then provided for analysis and the results of the analysis of the vibration-damper-related data, which takes place on the server 20, are transmitted back to the vehicle 1 (vehicle 1 which is illustrated by dashed lines after the end point 33) and are communicated to the driver of the vehicle 1. The level of the current wear (or status) of a specific shock absorber 13 or of the shock absorbers 13 may be illustrated e.g., by means of a color scale implemented on the display of the man-machine interface 18. In this regard, for example, the status may be illustrated in a corresponding color scale in which colors of green are used for a shock absorber 13 in new condition and the colors are graduated to red for a shock absorber which is functionally incapable as a result of wear.

Figure 3:
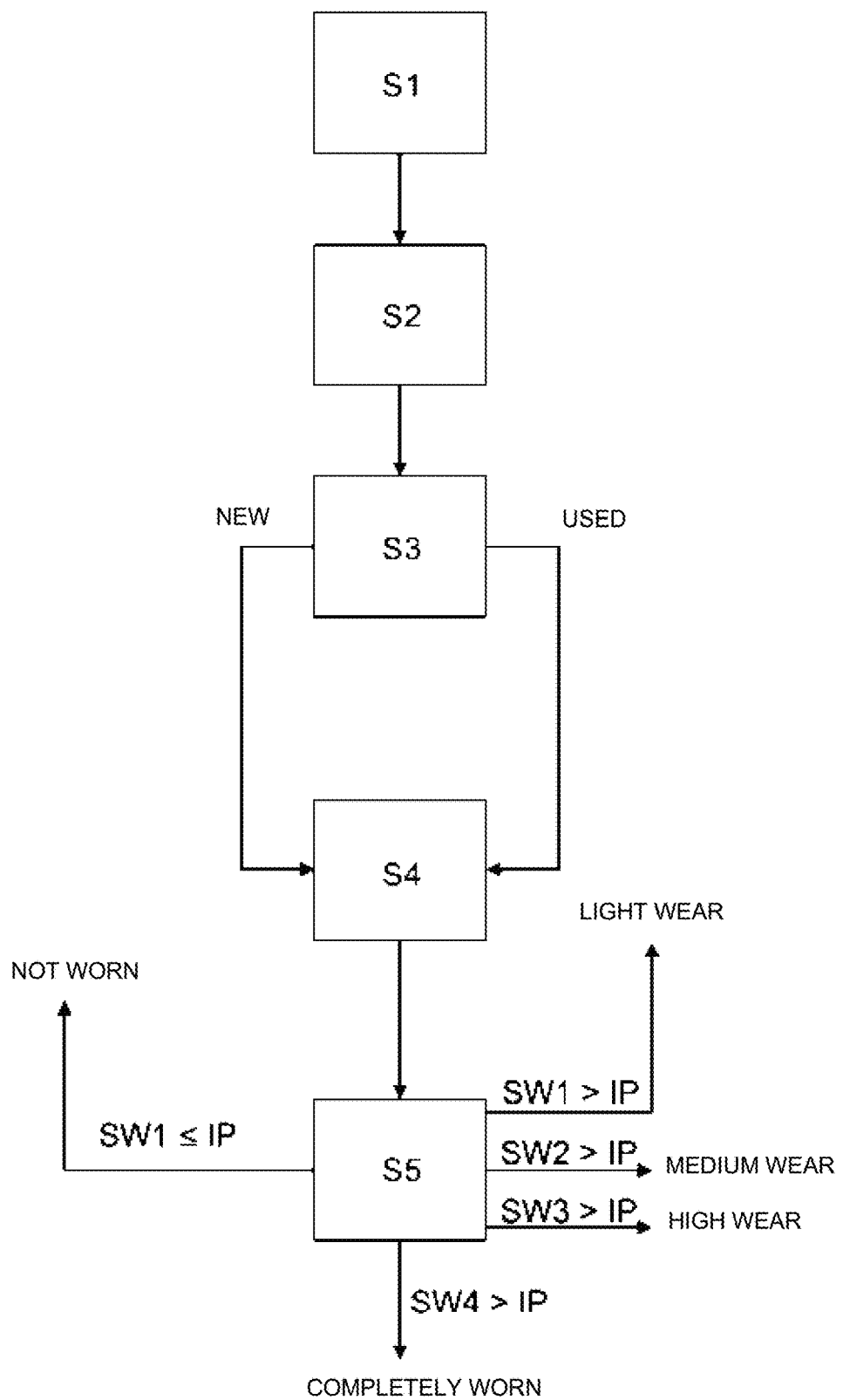
FIG. 3 illustrates a flow diagram for a method of monitoring vibration dampers of a vehicle in accordance with an example embodiment.

In an example embodiment, a method relating to the scenario shown in FIG. 2 is illustrated in FIG. 3. In a first operation S1 of the method, a suitable section 31 of the roadway 30, which is bounded by the points 32 (start) and 33 (end), may be determined or selected (e.g., by processing circuitry (e.g., a processor and memory configured accordingly by execution of stored instructions) disposed on the server side). In a second operation S2, data of a number of other vehicles driving through the section 31 are recorded while the other vehicles drive through the section 31, and the data is transmitted to the server 30. In a third operation S3, data associated specifically with vibration dampers may be sorted on the server 20 in order to determine (or infer) the service life of the shock absorbers. The data which originates from new shock absorbers or shock absorbers in new condition may be used for reference values in connection with this analysis.

In a fourth operation S4, the state of the vibration dampers 13 may be classified or determined by comparing data associated with one vehicle (or the current vehicle) with data associated with other vehicles (or reference vehicles). In this regard, the data associated with vibration dampers of the other vehicles in which the vehicle and/or the vibration dampers are in new condition may be used as reference values for non-worn vibration dampers. Average values of the speed of deflection and the entire spring travel of the vibrations dampers 13 may be included in the calculations for the current vehicle and for reference vehicles. The fourth operation S4 may be accomplished for a plurality of vehicles to build a database of comparative data. The comparative data may then be used to evaluate each or any individual vehicle (and its vibration dampers 13). In a fifth operation S5, the driver may be informed about the status of the vibration dampers 13 of the vehicle 1 based on the comparisons made in the fourth operation S4. The driver can decide, on the basis of the information regarding the status of the vibration dampers 13 of his/her vehicle 1, whether and when he or she wishes to initiate immediate change of the vibration dampers 13.

In an example embodiment, the classification described above may be carried out by means of an index of performance (IP) (referred to hereinafter as performance index (IP) or just "performance index"), which is determined as described above using equation (1). The classification may be assessed on the basis of a relationship of the performance index (IP) with defined threshold values. In this context, a plurality of threshold values, which each indicate a status change of the vibration damper are defined. In this regard, the next wear status is respectively reached when a threshold value is undershot.

If the performance index (IP) that is determined for the vibration damper 13 is above a first threshold value SW1, the vibration damper 13 may be considered to be basically in a new condition, and does not have significant wear so that the vibration damper 13 is assessed as fully functionally capable. The driver may not be provided with information at all, or alternatively may be provided with information indicating that the vibration damper 13 is fully functionally capable.

If the performance index (IP) that is determined for the vibration damper 13 is below a first threshold value SW1, this situation may be assessed as a low level of wear of the vibration damper 13. The driver may be provided with information indicating the low level of wear (or an absence of any communication may indicate a low level of wear). Given the low level of wear, and corresponding low likelihood of any loss of function of the vibration damper 13, the driver can comfortably plan in chronological terms to replace the vibration damper 13 or dampers of the vehicle 1 in the future, e.g., in the medium term.

If the performance index (IP) that is determined for the vibration damper 13 is below a second threshold value SW2 (higher than the first threshold value SW1), this situation may be assessed as a medium level of wear of the vibration damper 13. The driver may be provided with information indicating a result of the assessment. However, even for a medium level of wear, there is a relatively low likelihood of a loss of function of the vibration damper 13, so that the driver can still comfortably plan in chronological terms to replace the vibration damper or dampers of the vehicle 1 in the future, e.g., in the medium term.

If the performance index (IP) that is determined for the vibration damper 13 is below a third threshold value SW3 (which is higher than the first threshold value SW1 and the second threshold value SW2), this situation may be assessed as a high level of wear of the vibration damper 13. The driver may be provided with information indicating a result of the assessment. Given that the likelihood of a loss of function of the vibration damper 13 is higher with a high level of wear, the driver may be made aware that the vibration damper 13 or vibration dampers 13 should be replaced soon.

In still another situation, a loss of function may be detected. For example, if the performance index (IP) that is determined for the vibration damper 13 is below a threshold value SW4 (which is lower than the first threshold value SW1), this situation may be assessed as a loss of function of the vibration damper 13. The driver may be provided with information that the vibration damper 13 should be replaced as quickly as possible in such a situation.

Accordingly, a method for checking status of a vibration damper of a motor vehicle may be provided. The method may include selecting a suitable section of a roadway, via processing circuitry at a server, based on section selection criteria comprising a number of passing vehicles, a data input sufficient for correlation analyses of the vibration damper, and homogeneity of the roadway. The method further includes acquiring data from a plurality of other vehicles while the other vehicles are driving through the section, grouping data items from the acquired data that are specifically associated with vibration damper status, classifying the status of the vibration damper based on the data items, and informing the driver about the status of the vibration damper. The data on the number of the other vehicles may include data indicative of other vehicle vibration dampers in new condition defining reference values for a degree of wear of the vibration damper.

The method of some embodiments may include additional operations, modifications, augmentations and/or the like to achieve further objectives or enhance performance of the method. The additional operations, modifications, augmentations and/or the like may be added in any combination with each other. Below is a list of various additional operations, modifications, and augmentations that can each be added individually or in any combination with each other. For example, the acquired data may include components (e.g., individual pieces of information) including average speed of deflection and total amount of deflection of the vibration damper, average vehicle speed, weight of the vehicle, weight of the vehicle acting on the vibration damper, service life of the vibration damper, and presence of a continuously controlled damping (CCD) mode. In an example embodiment, the status of the vibration damper may be classified based on a performance index which is determined with average values of the speed of deflection and with a total amount of deflection of the vibration damper. In some cases, the status of the vibration damper may be assessed by relating the performance index to corresponding threshold values. The threshold values may be determined specific to the section of roadway based on performance indices calculated for all (or many) of the other vehicles that have previously traversed the section of the roadway. In an example embodiment, the section of the roadway is selected based on having at least a threshold amount of spring deflection data stored for the other vehicles and having a homogeneous surface. In some cases, the driver may be informed about the status of the vibration damper via a man-machine interface. In an example embodiment, alerting signs may be issued to the driver via the man-machine interface if the status of the vibration damper corresponds to a value above a threshold indicating a level of wear or non-functioning of the vibration damper. In some cases, the data items are associated with values that change according to running time of the vibration damper.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Moreover, although the foregoing descriptions and the associated drawings describe exemplary embodiments in the context of certain exemplary combinations of elements and/or functions, it should be appreciated that different combinations of elements and/or functions may be provided by alternative embodiments without departing from the scope of the appended claims. In this regard, for example, different combinations of elements and/or functions than those explicitly described above are also contemplated as may be set forth in some of the appended claims. In cases where advantages, benefits or solutions to problems are described herein, it should be appreciated that such advantages, benefits and/or solutions may be applicable to some example embodiments, but not necessarily all example embodiments. Thus, any advantages, benefits or solutions described herein should not be thought of as being critical, required or essential to all embodiments or to that which is claimed herein. Although specific terms are employed herein, they are used in a generic and descriptive sense only and not for purposes of limitation.

That which is claimed:

1. A method for checking status of a vibration damper of a select motor vehicle, the method comprising:
    selecting a suitable section of a roadway, via processing circuitry at a server, based on section selection criteria comprising a number of passing vehicles, a data input sufficient for correlation analyses of the vibration damper, and homogeneity of the roadway;
    acquiring other vehicle data from a plurality of other vehicles measured while the other vehicles are driving through the section;
    grouping data items from the acquired other vehicle data that are specifically associated with vibration damper statuses of vibration dampers of the other vehicles;
    acquiring select motor vehicle data from the select motor vehicle measured while the select motor vehicle is driving through the section;
    classifying the status of the vibration damper of the select motor vehicle based on a comparison of the select motor vehicle data to the data items, wherein the data from the plurality of other vehicles comprises data indicative of other vehicle vibration dampers in new condition to define reference values for a degree of wear of the vibration damper of the select motor vehicle; and
    communicating the status of the vibration damper of the select motor vehicle to inform a driver of the select motor vehicle about the status of the vibration damper.

2. The method according to claim 1, wherein the select motor vehicle data includes components selected from a group comprising:
    average speed of deflection and total amount of deflection of the vibration damper,
    average vehicle speed of the select motor vehicle,
    weight of the select motor vehicle,
    weight of the select motor vehicle acting on the vibration damper,
    service life of the vibration damper, and
    presence of a continuously controlled damping (CCD) mode of the select motor vehicle.

3. The method according to claim 1, wherein the section of the roadway is selected based on having at least a threshold amount of spring deflection data stored for the other vehicles and having a homogeneous surface.

4. The method according to claim 1, wherein the data items are associated with values that change according to running time of the vibration damper.

5. The method of claim 1, wherein the vibration damper of the select motor vehicle has a damper type; and
    wherein the comparison of select motor vehicle data to the data items comprising comparing data items associated with vibration dampers of the other vehicles of that are of a same damper type as the vibration damper of the select motor vehicle.

6. The method of claim 1, wherein the suitable section of roadway is further selected based on a correlations in normalized spring travel data distances for a number of vehicles traversing the section of roadway.

7. The method according to claim 1, wherein the status of the vibration damper is classified based on a performance index which is determined with average values of the speed of deflection and with a total amount of deflection of the vibration damper.

8. The method according to claim 7, wherein the performance index is determined with the formula:

$$IP = \left(c_a * \frac{\Sigma |V_D|}{N} + c_b * s_{Ftotal}\right) * c_v * c_l$$

wherein $v_D$ is a current speed of deflection, N is a number of measurements, $S_{Ftotal}$ is the total amount of deflection carried out, $c_v$ is a correction factor based on speed of the vehicle, $c_l$ is a correction factor based on weight of the select motor vehicle, $c_a$ and $c_b$ are correction factors for influencing the speed of deflection and the total amount of deflection of the vibration damper.

9. The method according to claim 7, wherein the status of the vibration damper is assessed by relating the performance index to corresponding threshold values.

10. The method according to claim 1, wherein the driver is informed about the status of the vibration damper via a man-machine interface.

11. The method according to claim 10, wherein alerting signs are issued to the driver via the man-machine interface if the status of the vibration damper corresponds to a value above a threshold indicating a level of wear or non-functioning of the vibration damper.

12. A vehicle suspension system for a motor vehicle having at least two wheels, each of the at least two wheels including an instance of a vibration damper in a respective corner area of the vehicle, the system comprising:
   a control device comprising processing circuitry;
   a connecting device configured to enable wireless communication between the vehicle and the internet; and
   a man-machine interface for providing information to a driver of the vehicle,
   wherein at least one vibration damper in a front part of the vehicle has a first height sensor, and at least one vibration damper in a rear part of the vehicle has a second height sensor;
   wherein the processing circuitry is configured to:
      acquire measurement data associated with the operation of the at least one vibration damper measured while the motor vehicle driving through a section of roadway selected based on based on section selection criteria comprising a number of passing vehicles, a data input sufficient for correlation analyses of the vibration damper, and homogeneity of the roadway;
      provide the measurement data to a remote server via the connecting device for comparison with other vehicle data associated with operation of vibration dampers of a plurality of other vehicles traversing the section of roadway to determine a status of the at least one vibration damper based on the other vehicle data; and
      communicate the status of the at least one vibration damper via the man-machine interface to inform the driver about the status of the at least one vibration damper.

13. The system according to claim 12, wherein the first and second height sensors are configured to determine a speed of deflection and a spring deflection of the at least one vibration damper in the front part of the vehicle and the at least one vibration damper in the rear part of the vehicle, respectively;
   wherein the measurement data associated with the operation of the at least one vibration damper comprises values for the speed of deflection and spring deflection.

14. The system according to claim 12, wherein alerting signs are issued to the driver via the man-machine interface if the status of the at least one vibration damper corresponds to a value above a threshold indicating a level of wear or non-functioning of the at least one vibration damper.

15. The system according to claim 12, wherein the remote server is configured to acquire the other vehicle data for the plurality of vehicles, the other vehicle data comprising average speed of deflection and total amount of deflection of the vibration dampers of the other vehicles, average vehicle speed of the other vehicles, vehicle weight of the other vehicles, and vibration damper service life of the other vehicles.

16. The system according to claim 15, wherein the control device is configured to determine the status of the at least one vibration damper in a front part of the vehicle and the at least one vibration damper in a rear part of the vehicle based on a performance index which is determined with average values of speed of deflection total amount of deflection information for vibration dampers of the plurality of other vehicles.

17. The system according to claim 16, wherein the status is assessed by relating the performance index to corresponding threshold values.

18. The system according to claim 16, wherein the section of the roadway is selected based on having at least a threshold amount of spring deflection data stored for the plurality of other vehicles and having a homogeneous surface.

19. A vehicle suspension system for a motor vehicle having at least two wheels, each of the at least two wheels including an instance of a vibration damper in a respective corner area of the vehicle, the system comprising:
   a control device comprising processing circuitry;
   a connecting device configured to enable wireless communication between the vehicle and the internet; and
   a man-machine interface for providing information to a driver of the vehicle,
   wherein at least one vibration damper in a front part of the vehicle has a first height sensor, and at least one vibration damper in a rear part of the vehicle has a second height sensor;
   wherein the server is configured to acquire data for a plurality of vehicles traversing a selection section of roadway to gather data from a plurality of vehicles including average speed of deflection and total amount of deflection of vibration dampers of respective ones of the plurality of vehicles, average vehicle speed, vehicle weight, and vibration damper service life;
   wherein the control device is configured to determine a status of the at least one vibration damper in a front part of the vehicle and the at least one vibration damper in a rear part of the vehicle based on a performance index which is determined with average values of speed of deflection total amount of deflection information for vibration dampers of the plurality of other vehicles;
   wherein the performance index is determined with the formula:

$$IP = \left( c_a * \frac{\sum |V_D|}{N} + c_b * S_{Ftotal} \right) * c_v * c_l$$

wherein $v_D$ is a current speed of deflection, N is a number of measurements, $S_{Ftotal}$ is the total amount of deflection carried out, $c_v$ is a correction factor based on speed of the vehicle, $c_l$ is a correction factor based on weight of the vehicle, $c_a$ and $c_b$ are correction factors for influencing the speed of deflection and the total amount of deflection of the vibration damper.

* * * * *